(12) United States Patent
Shah et al.

(10) Patent No.: US 7,632,476 B2
(45) Date of Patent: Dec. 15, 2009

(54) METHOD OF RECOVERING CARBON DIOXIDE FROM A SYNTHESIS GAS STREAM

(75) Inventors: Minish Mahendra Shah, East Amherst, NY (US); Raymond Francis Drnevich, Clarence Center, NY (US); Aqil Jamal, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 539 days.

(21) Appl. No.: 11/370,984

(22) Filed: Mar. 9, 2006

(65) Prior Publication Data
US 2007/0212286 A1 Sep. 13, 2007

(51) Int. Cl.
B01D 53/14 (2006.01)
C07C 27/06 (2006.01)

(52) U.S. Cl. .................. 423/220; 423/350; 423/351; 252/373; 60/780; 518/704

(58) Field of Classification Search ............. 423/220, 423/350, 351; 252/373; 60/780; B01D 53/14; C07C 27/06
See application file for complete search history.

(56) References Cited

U.S. PATENT DOCUMENTS

| | | | |
|---|---|---|---|
| 3,622,267 A | 11/1971 | Bartholome et al. | 23/2 R |
| 4,336,233 A | 6/1982 | Appl et al. | 423/228 |
| 4,353,418 A * | 10/1982 | Hoekstra et al. | 166/259 |
| 4,545,976 A * | 10/1985 | Osman | 423/650 |
| 4,553,981 A | 11/1985 | Fuderer | 48/62 |
| 6,505,467 B1 | 1/2003 | Fjellhaug et al. | |
| 6,592,829 B2 | 7/2003 | Chakravarti et al. | |
| 6,706,770 B2 | 3/2004 | Patel et al. | |
| 6,753,352 B2 | 6/2004 | Seiki et al. | |
| 6,838,071 B1 | 1/2005 | Olsvik et al. | |

(Continued)

FOREIGN PATENT DOCUMENTS

EP 0035328 9/1981

(Continued)

OTHER PUBLICATIONS

Nair, "Improve $CO_2$ Removal From Ammonia Plants", Hydrocarbon Processing (2005) pp. 77-82.

(Continued)

*Primary Examiner*—Melvin C Mayes
*Assistant Examiner*—Jun Li
(74) *Attorney, Agent, or Firm*—David M. Rosenblum

(57) ABSTRACT

A method of recovering carbon dioxide from a synthesis gas stream generated within a synthesis gas facility. After the synthesis gas stream is passed through at least one process heat exchanger of the steam generation system located downstream of the water-gas shift reactor, the temperature of the synthesis gas stream is increased while simultaneously adding steam to the synthesis gas stream. Thereafter, the synthesis gas stream is added to an absorption system having an absorption zone utilizing a solvent to absorb the carbon dioxide and a regeneration zone to disengage the carbon dioxide from the solvent and thereby regenerate the solvent. Heat is transferred from the synthesis gas stream to the regeneration zone to promote disengagement of the carbon dioxide from the steam and such that between about 40 percent and about 90 percent of the carbon dioxide originally present in the synthesis gas stream is recovered.

12 Claims, 5 Drawing Sheets

U.S. PATENT DOCUMENTS

2003/0022948 A1* 1/2003 Seiki et al. .................. 518/704
2003/0141223 A1   7/2003 Wagner et al. .............. 208/312
2004/0060334 A1   4/2004 Palmer ......................... 71/31
2005/0080146 A1* 4/2005 Abbott et al. ............... 518/703

FOREIGN PATENT DOCUMENTS

EP   1419992 A2 * 5/2004

OTHER PUBLICATIONS

Di Zanno et al. "Hydrogen Manufacturing Plant with $CO_2$ Recovery and PSA Purification; Design and Operating Experience", ERTC 10th Annual Meeting (2005).

* cited by examiner

METHOD OF RECOVERING CARBON DIOXIDE FROM A SYNTHESIS GAS STREAM

FIELD OF THE INVENTION

The present invention relates to a method of recovering carbon dioxide from a synthesis gas stream.

More particularly, the present invention relates to such a method in which the synthesis gas is produced by a steam methane reforming installation having a water-gas shift reactor and a steam generation system and the carbon dioxide is recovered from the synthesis gas stream after having passed through the water-gas shift reactor by absorbing the carbon dioxide within a solvent.

BACKGROUND OF THE INVENTION

Synthesis gas contains carbon monoxide and hydrogen that can be further purified to produce hydrogen and carbon monoxide products or can be further reacted in such downstream chemical processes that, for example, involve the production of methanol or known gas to liquid processes for synthetic fuels by means of the Fischer-Thropsch process.

Synthesis gas is generated within a steam methane reformer by introducing a hydrocarbon containing feed, typically natural gas, into steam methane reformer tubes located in a radiant section of the steam methane reformer. The reformer tubes are packed with a catalyst that is used to promote the steam methane reforming reactions. Steam methane reforming reactions are endothermic and hence, heat is supplied to the reformer tubes to support the reactions by burners firing into the radiant section of the steam methane reformer. Synthesis gas can also be generated in a partial oxidation reactor by reaction between hydrocarbon and oxidant (e.g. oxygen) or in an autothermal reformer by reaction between hydrocarbon, oxidant and steam.

After a synthesis gas stream has been cooled, the steam and carbon monoxide content of the synthesis gas can be further reacted in a water-gas shift reactor to increase the hydrogen content of the synthesis gas.

An integrated steam generation system is located within the synthesis gas plant to produce the steam for the steam methane reforming reaction, for the water gas shift reaction and also, for export. The exported steam can itself constitute a valuable product that can effect the economic viability of the facility. Steam methane reformers typically have convective heat exchange sections that are connected to the radiant sections. The heated flue gases produced by the burners firing into the radiant section are passed through the convection section to raise steam and to superheat steam for the purposes outlined above. The steam generation system also utilizes heat exchangers both upstream and downstream of the water-gas shift reactor. In this regard, the synthesis gas stream generated in the steam methane reformer must be reduced in temperature to a level suitable for the water-gas shift reactor and consequently, a heat exchanger located upstream of the water-gas shift reactor both cools the synthesis gas stream and raises some of the steam. Since the water gas shift reaction is an exothermic process, the heat contained in the shifted stream is commonly utilized in heat exchangers located downstream of the water-gas shift reactor for the production of additional steam. All of such steam is routed to a steam header and then superheated in the convective section of the steam methane reformer.

The synthesis gas produced by the steam methane reforming reactions has a carbon dioxide content. After the water-gas shift reactor, the carbon dioxide content of the synthesis gas is further increased as a result of the reaction of the steam with the carbon monoxide. Separation of the carbon dioxide from the synthesis gas is often necessary for downstream processing of the synthesis gas, for example, in methanol production. Additionally, carbon dioxide itself is a valuable product. Thus, various carbon dioxide removal systems have been integrated with steam methane reforming facilities in order to at the very least to separate the carbon dioxide from the synthesis gas but also, to recover the carbon dioxide for sequestration purposes or for use as a value added product.

The carbon dioxide is separated from synthesis gas streams by absorbent systems. Such absorbent systems cam utilize solvents such as hot potassium carbonate, but more typically primary, secondary or tertiary amines for example monoethanolamine (MEA), diethanolamine (DEA), methldiethanolamine (MDEA), also mixtures of amines More recently MDEA and piperazine have been used as a solvent.

For example in U.S. Pat. No. 3,622,267, a synthesis gas under pressure of 40 atmospheres and containing 30 percent by volume of carbon dioxide is introduced into the bottom of an absorption column. An MDEA solvent is passed countercurrently to the synthesis gas in the absorber column to produce a column overhead that contains a low percentage of carbon dioxide. The rich liquid, that is produced as a liquid column bottoms of the absorber column, is then introduced to a packed column countercurrently with the carbon dioxide separated from the solvent in a regeneration column. The separated carbon dioxide is removed from the top of the packed column and a bottoms stream of solvent is introduced into an intermediate location of the absorber column. The remaining portion of the solvent is introduced into a regeneration column that is operated at a lower pressure than the absorbent column to produce the carbon dioxide and to regenerate the solvent which is reintroduced to the top of the absorption column. The regeneration column is reboiled with a boiler. In another embodiment, the bottoms liquid of the packed column is introduced into the regeneration column and the regenerated solvent is pumped back to the top of the absorption column.

U.S. Pat. No. 4,553,981 is an integrated process where carbon dioxide is scrubbed from a synthesis gas stream in a scrubbing column. The synthesis gas is produced by successive partial oxidation and water-gas shift reactor. The resultant scrubbed gas is then further treated in a pressure swing absorption unit to produce a hydrogen product. In this patent, the synthesis gas stream after having passed through the water-gas shift reactor has a temperature of about 430° C. This stream is passed to the scrubbing column that utilizes a physical absorbent to absorb the carbon dioxide. The physical absorbent after having been loaded with the carbon dioxide is flashed in flash tanks to regenerate the solvent so that it can be pumped back to the scrubber column.

U.S. Pat. No. 4,336,233 discloses another process that can be used to remove carbon dioxide as well as hydrogen sulphide, carbonyl sulphides and sulphur dioxide from a synthesis gas. In this patent, mixtures of piperazines and amines can be used as a solvent. Gas to be purified is introduced into an absorption column in which the carbon dioxide is absorbed within the solvent. The resultant rich liquid column bottoms of the absorption column is then expanded in a turboexpander and then introduced in a preliminary flash column to produce a flash gas and a purified column bottoms that is in turn introduced into a regeneration column in which the bottoms is reboiled to regenerate the solvent for use in the absorption column.

U.S. patent application 2003/0141223 discloses a similar process to that outlined above that uses an amine solvent in which loaded absorption liquid is first expanded to a pressure of from between about 1 to 2 bars absolute. The rich liquid is then partially regenerated in a first low-pressure expansion stage that utilizes a packed column and is then further expanded to a pressure from between about 1 to 2 bar (absolute) and introduced into a second low-pressure expansion stage. Second low-pressure expansion stage regenerates the absorbent for use in the absorption column.

In the integration of any of the processes discussed above with a steam methane reforming facility, a balance must be struck between the need to generate export steam with the desirability of recovering carbon dioxide because the temperature at which syngas is supplied to the absorption system, utilizing either a physical or a chemical adsorbent, will in large part determine the carbon dioxide recovery. Put another way, while it is desirable to supply the syngas to an absorption system at a higher temperature, a level can be reached at which steam production will necessarily suffer, thereby to have an effect on plant economics. However, where the synthesis gas is treated at a lower temperature, recoveries within the absorption column will tend to fall off to low levels of about 50 percent or less. This will occur where the synthesis gas stream is treated after the water-gas shift reactors and the downstream heat exchangers and the heat for the absorption process is solely supplied by the heat contained within the synthesis gas stream that typically has a temperature of anywhere between about 90° C. and about 150° C.

Hence, in order to boost recovery of the carbon dioxide, heat from another source that constitutes an addition to the heat of the synthesis gas stream itself must be used. The logical source of such heat addition is from steam. For example, in a paper, "Hydrogen Manufacturing Plant with $CO_2$ Recovery and PSA Purification; Design and Operating Experience", ERTC $10^{th}$ Annual Meeting, Nov. 14-16, 2005, Vienna, Austria by Air Liquide and Haldor Topsoe, carbon dioxide is recovered in an MDEA wash downstream of the water-gas shift reactor heat exchangers and a water knock-out drum with the use of additional steam. Although details of the recovery process are not set forth in any detail in this paper it would appear that the carbon dioxide recovered is between 40 percent to 52 percent.

Another example of utilizing steam and a feed gas to provide the heat in an absorption process can be found in "Improve $CO_2$ removal from ammonia plants", by Nair, Hydrocarbon Processing August 2005. In this paper, a hot potassium carbonate-based carbon dioxide process is disclosed in which the regenerator column is reboiled by heat supplied by both low pressure steam and the feed gas through indirect heat exchange from bottom liquids.

The use of the synthesis gas at a lower temperature such as suggested by the Air Liquide, Haldor Topsoe paper presents a problematical integration in a retrofit situation because the absorption system must be located physically close to the existing equipment to avoid condensation of the water content of the synthesis gas which at the point of extraction of the synthesis gas is at or near its dew point. While, in a chemical facility, there exists many sources of inexpensive low pressure steam, the utilization of the same as a source of additional heat with the synthesis gas stream in separate heat exchangers will still require that the absorption facility be located close to the existing equipment to avoid condensation of the water content within the synthesis gas.

As will be discussed, the present invention, among other advantages, provides an integration in which carbon dioxide is recovered in an absorption system that is not constrained to be located particularly close to the point at which the synthesis gas is removed from the steam methane reforming system while allowing for a good economic balance of the requirement of consumption of steam, if any, from the steam generation system.

SUMMARY OF THE INVENTION

The present invention provides a method of recovering carbon dioxide from a synthesis gas stream generated within a facility having a synthesis gas reactor, a water-gas shift reactor and a steam generation system for generating steam for the synthesis gas reactor and for export. It is to be noted that the term, "synthesis gas reactor" means herein or in the claims a steam methane reformer, an autothermal reformer or a catalytic partial oxidation reactor or combinations of such reactors, all known in the art.

In accordance with the method heat is exchanged from at least part of a steam stream to the synthesis gas stream to increase temperature of the synthesis gas stream while simultaneously adding steam to the synthesis gas stream to produce a heated synthesis gas stream having a final steam content that is in a superheated state. The synthesis gas is extracted from the facility after the synthesis gas stream has passed through at least one process heat exchanger of the steam generation system located downstream of the water-shift reactor and has an initial steam content that is at or near its dew point.

The heated synthesis gas stream is introduced into an absorption system having an absorption zone utilizing a solvent for absorbing the carbon dioxide contained within the synthesis gas stream, thereby to produce a rich liquid containing the carbon dioxide and a treated synthesis gas stream having a lower content of the carbon dioxide than the synthesis gas stream. A regeneration zone is operatively associated with the absorption zone for receiving solvent having absorbed carbon dioxide and disengaging the carbon dioxide from the solvent, thereby to regenerate the solvent and for returning the solvent after having been regenerated to the absorption zone. Heat is transferred from the heated synthesis gas stream to the regeneration zone for promoting the disengagement of the carbon dioxide from the solvent. A carbon dioxide stream composed of the carbon dioxide separated from the rich liquid is recovered. The flow rate of the steam stream is controlled so that between about 40 percent and about 90 percent of the carbon dioxide contained in the synthesis gas stream is recovered in the carbon dioxide stream.

The steam stream can be high-pressure superheated steam and the heat can be transferred to the synthesis gas stream and steam is added thereto by extracting high-pressure superheated steam from the steam generation system, forming the steam stream from the superheated steam and combining at least part of the steam stream with synthesis gas stream. Alternatively, the steam stream can be low pressure steam. As used herein and in the claims, the term "low pressure steam" means steam having a pressure of between about 75 psia and about 200 psia and a temperature of between about 320° F. and about 390° F. In such case the heat is transferred to the synthesis gas stream and steam is added thereto by introducing the synthesis gas stream into a saturator and indirectly transferring heat from a steam stream to a water stream from the saturator and thereafter reintroducing the water into the saturator so that the synthesis gas stream and the water stream are countercurrently passed through the saturator. Heat is also transferred to the synthesis gas stream from the steam stream after the addition of the steam thereto in the saturator through indirect heat exchange with the steam stream.

It is to be noted that where the synthesis gas is utilized at a relatively low temperature and without steam, generally speaking, 50 percent or less of the carbon dioxide can be recovered. By adding steam, more of the carbon dioxide can be recovered because more heat is being transferred to promote the disengagement of the carbon dioxide from the solvent. Where superheated steam from the steam generation system of the facility is mixed directly with the synthesis gas stream, the steam content of the synthesis gas can be raised to a superheated level allowing for some latitude in the location of the absorption system with respect to the point at which the synthesis gas is removed. The same is true where a saturator is used in that the synthesis gas stream and added steam can be heated to again superheat the steam content of the synthesis gas stream. As will be discussed, each specific method can be utilized in an economically advantageous manner.

In a typical absorption system, the carbon dioxide is absorbed within the solvent by cooling the synthesis gas to condense the water content thereof and thereby to produce a condensate. The condensate is then separated from the synthesis gas stream to produce a lower water content synthesis gas stream.

The absorption zone in such a typical system is formed by an absorption column and the lower water content synthesis gas stream and the solvent are countercurrently passed within a first set of mass transfer elements located within the absorption column to absorb the carbon dioxide in the solvent as the solvent descends in the absorption column. This produces the rich liquid as a first liquid column bottoms and the treated synthesis gas as a first column overhead.

The regeneration zone can typically include a low pressure flash column and the solvent containing the absorbed carbon dioxide can be expanded into the low pressure flash column to produce an initial disengagement of a portion of the carbon dioxide from the rich liquid and an intermediate liquid containing the solvent in a further portion of the carbon dioxide. A second set of mass-transfer contact elements can be provided to contact the intermediate liquid as it descends through the second set of mass-transfer contact elements with an ascending vapor phase to affect an additional disengagement of the further portion of the carbon dioxide from the intermediate liquid and the liquid column bottoms. This will produce a second column overhead composed of the carbon dioxide and a second liquid column bottoms composed of the regenerated solvent. A regenerated solvent stream, made up of the second liquid column bottoms, is extracted from the low pressure flash column, cooled and then pumped back into the absorption column to introduce the solvent into the absorption column to absorb the carbon dioxide. The carbon dioxide stream is made up of the second column overhead and is extracted from the low pressure flash column.

Preferably the solvent functions as both a physical absorbent and a chemisorbent. A water stream is added to the absorption column and washes down any solvent contained in the treated synthesis gas used in forming the treated synthesis gas stream. The condensate derived from the heated synthesis gas stream is a first condensate and the water content is separated therefrom is a first water content. The carbon dioxide stream is cooled to condense out a second water content of the carbon dioxide stream and thereby to produce a second condensate. A second condensate stream composed of the second condensate is introduced into the low pressure flash column and washes down any solvent contained in the carbon dioxide produced as the second column overhead.

The heat can be transferred to the regeneration zone by indirectly exchanging heat from the heated synthesis gas stream to the second liquid column bottoms so that the ascending vapor phase is formed without boiling the second liquid column bottoms.

A yet further alternative is for the heat to be indirectly transferred from the heated synthesis gas stream to the rich liquid stream prior to being expanded into the low pressure flash column.

The steam stream can be divided into first and second subsidiary streams. Part of the heat can be transferred from the first subsidiary stream to the synthesis gas stream while adding steam thereto, thereby to form the heated synthesis gas stream. A remaining part of the heat can be transferred from the second subsidiary stream to the second liquid column bottoms so that the ascending vapor phase is formed without boiling the second part of the liquid column bottoms. Heat can be indirectly transferred from the heated synthesis gas stream to the rich liquid stream composed of the rich liquid. The rich liquid stream can thereafter be expanded into the low pressure flash column.

In any embodiment of the present invention, the carbon dioxide stream can be compressed in stages with stage interstage cooling and water removal to form a compressed carbon dioxide stream.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

In order to avoid repetition in the description of the various embodiments of the present invention, the same reference numbers have been used in successive drawings where the elements and features designated by such reference numbers have the same description.

DETAILED DESCRIPTION

Figure 1:
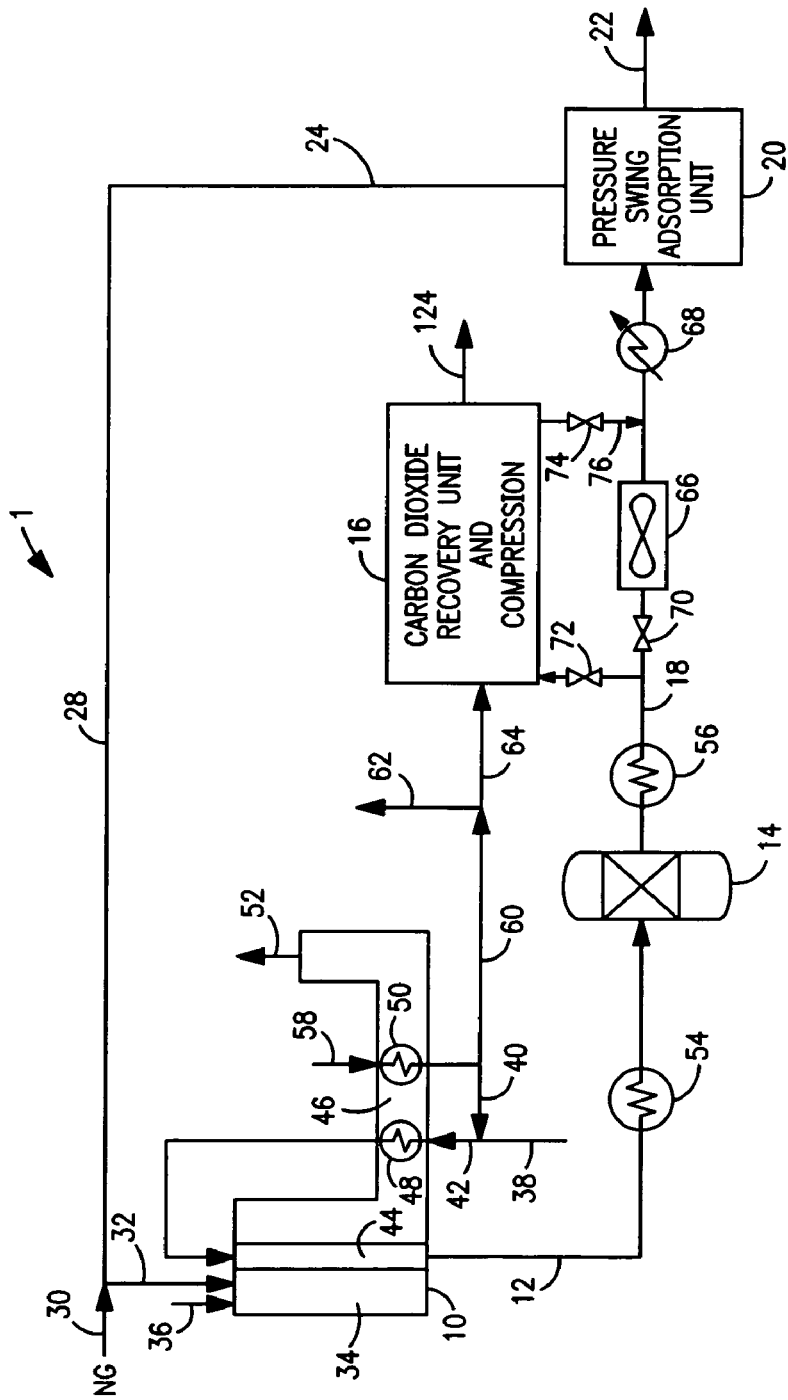
FIG. 1 is a simplified schematic of a facility having a steam methane reformer, a water-gas shift reactor, a pressure swing absorption system and a carbon dioxide recovery system for carrying out a method in accordance with the present invention.

With reference to FIG. 1 a facility 1 is illustrated having a steam methane reformer 10 for generating a crude synthesis gas stream 12, a downstream water-gas shift reactor 14 and a carbon dioxide absorption system 16 for recovering carbon dioxide from a synthesis gas stream 18 in which the hydrogen content has been upwardly shifted by water-gas shift reactor 14.

In facility 1, a pressure swing adsorption unit 20 is provided to purify the hydrogen into a hydrogen product stream 22 in a known manner. For example, hydrogen adsorption unit 20 can have adsorbent beds operating out of phase so that while one bed is adsorbing the non-hydrogen components and producing purified hydrogen product as an overhead, another bed is being regenerated at a lower pressure than the bed currently on line to produce the hydrogen product. An example of adsorbents used for such purposes comprise of layers of alumina activated carbon and zeolite compounds. The purification of synthesis gas steam 18 within pressure swing absorption unit 20 produces a tail gas stream 24 that contains hydrogen, carbon dioxide, carbon monoxide, nitrogen, methane and other hydrocarbons.

Tail gas stream 24 can be combined with a natural gas stream 30 or other hydrocarbon containing fuel to form a fuel stream 32. Fuel stream 32 is introduced into a burner located within a radiant heat exchange section 34 of steam methane reformer 10 along with an oxygen containing stream 36, for instance, air, to support combustion of the fuel stream 32. A hydrocarbon containing stream 38 that can also be natural gas is combined with a superheated steam stream 40 to produce a reactant stream 42 and introduced into reformer tubes such as reformer tube 44 located within radiant section 34 of steam methane reformer 10. In steam methane reformer 10, hydrocarbons react with steam in known steam methane reforming reactions that are endothermic in nature. Heat is supplied to support such steam methane reformers by combustion of fuel stream 32. The flue gases resulting from such combustion pass through a convective section 46 of steam methane reformer 10 having a process gas heat exchanger 48 and a steam superheater 50 that forms part of the steam generation system. The flue gases are discharged as a flue gas stream 52 from a stack as stack gases.

The crude synthesis gas stream 12 is cooled in a process gas boiler 54, that along with steam superheater 50, forms part of the steam generation system. The process gas boiler 54 serves to cool the crude synthesis gas stream 12 to a temperature suitable for the water gas shift reactions in water-gas shift reactor 14 in which the hydrogen content is upwardly adjusted by reacting the steam content of crude synthesis gas stream 12 with carbon monoxide. The resultant synthesis gas stream 18, also known in the art as the shift stream, can pass through a feed heater, not illustrated, but that as known in the art is used to heat the hydrocarbon containing feed 38. After having been heated, hydrocarbon containing feed 38 passes through a hydrotreater that converts sulfur species to hydrogen sulphide and then to a zinc-based adsorbent bed to remove the hydrogen sulphide from the feed. The hydrotreater and the adsorbent bed are not illustrated, but are very well known in the art.

The synthesis gas stream 18 passes through a boiling feed water heater 56 that also forms part of the steam generation system. The steam generated in boiling feed water heater 56 and the steam stream raised in process gas boiler 54 are introduced into a steam drum. Steam is extracted from the steam drum as a steam stream 58 and in part forms steam stream 40 used in forming reactant stream 42.

Another portion of the superheated steam stream 58 is used in forming steam stream 60 that in part is exported as an export steam stream 62 and also, as a superheated steam stream 64 is introduced into carbon dioxide removal system 16.

Synthesis gas stream 18 is then passed through a fin-fan cooler 66 and then through a water-cooled cooler 68 before entering pressure swing absorption system 20. Synthesis gas stream 18 has a pressure of between about 250 psia and about 500 psia, a temperature of between about 220° F. and about 310° F., preferably between about 260° F. and about 290° F. and a composition of between about 50 percent to about 70 percent hydrogen, about 10 to about 20 percent carbon dioxide, about 1 to about 5 percent carbon monoxide, about 3 percent to about 7 percent methane and about 12 percent to about 22 percent water, all on a volume basis. Within such composition, the water or more properly the steam content is at or at least near its dew point.

The flow of synthesis gas stream 18 with respect to carbon dioxide removal system 16 is controlled by control valves 70, 72 and 74. When control valves 72 and 74 are in a closed position and control valve 70 is in an open position. Synthesis gas stream 18 passes to pressure swing absorption unit 20 as aforesaid. When control valve 70 is in a closed position and control valves 72 and 74 are set in open positions, synthesis gas stream 18 passes to carbon dioxide separation system 16 and then is returned as a treated synthesis gas stream 76 having a lower carbon dioxide content than synthesis gas stream 18. Treated synthesis gas stream 76 is then routed to pressure swing absorption system 20 for hydrogen production. As can be appreciated, the setting of control valves 72 and 74 in the closed position allow for maintenance activities to be conducted on the equipment contained within carbon dioxide separation system 16. Partial opening of valves 70 and 72 can allow carbon dioxide recovery from a portion of syngas. The treated syngas is returned via valve 74 and mixed with the remainder portion of untreated syngas and then passed on to the PSA unit 20.

Figure 2:
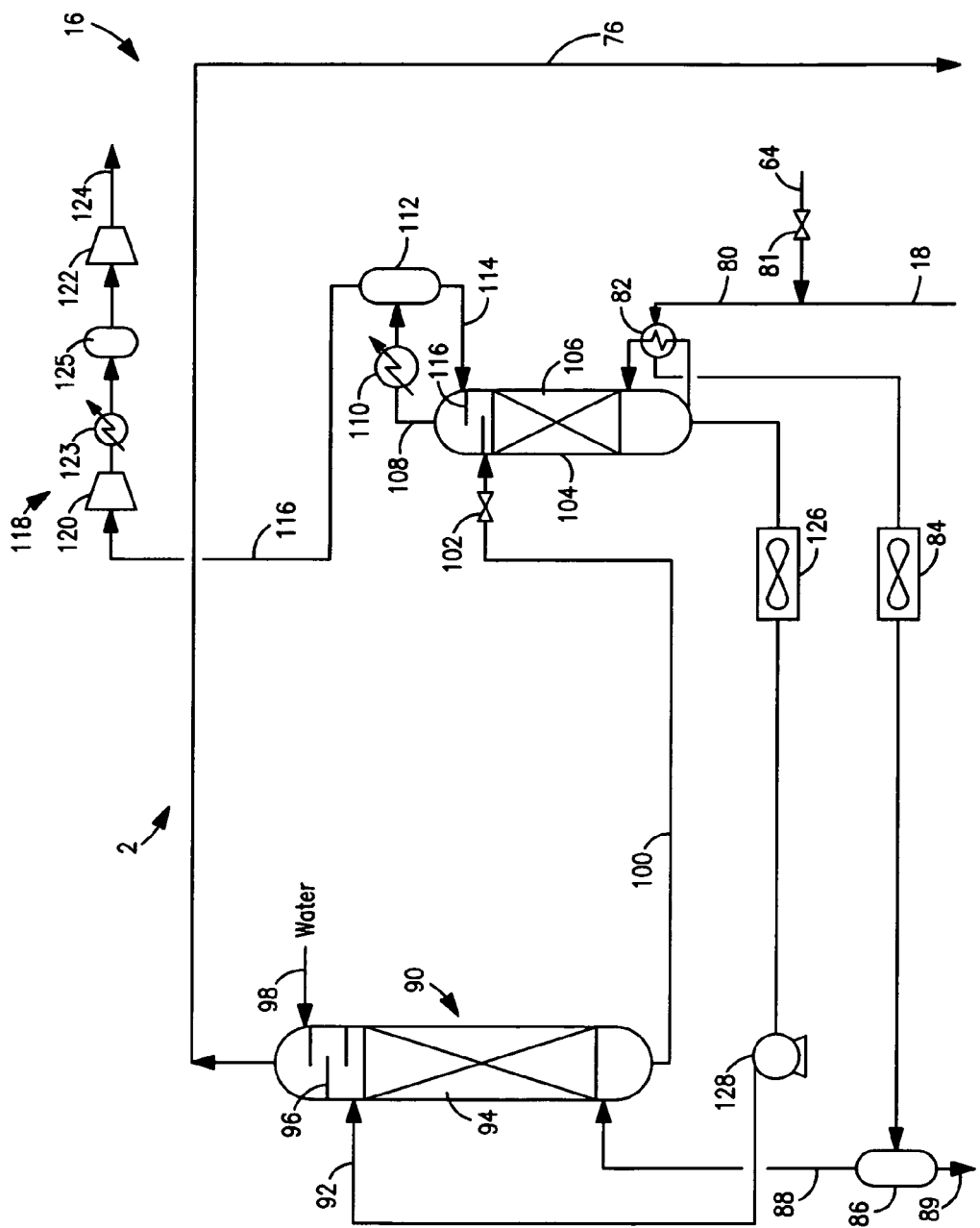
FIG. 2 is a schematic of an adsorption system for carrying out a method in accordance with the present invention.

Carbon dioxide system 16 can take many forms. With reference to FIG. 2, a particularly advantageous form is illustrated by absorption system 2 in which synthesis gas stream 18 is mixed with superheated steam stream 64 taken from the steam generation system of facility 1 to produce a heated synthesis gas stream 80. Superheated steam stream 64 has a temperature of between about 420° F. and about 900° F. and a pressure of between about 250 psia and about 900 psia. Hence, a valve 81 containing an orifice is used to reduce the pressure of superheated steam stream 64 to a pressure corresponding to the pressure in the syngas stream which is between about 250 psia and about 500 psia, resulting in a decrease in temperature to between about 410° F. to about 895° F. The decrease in temperature will depend on the degree of superheat of the superheated steam stream and difference in pressure between superheated steam stream and synthesis gas stream. For example, if syngas is at about 380 psia and superheated steam is supplied at about 650 psia and 700° F., then reducing the pressure of steam to 380 psia will result in the temperature of steam to decrease from 700° F. to 671° F.

Heated synthesis gas stream 80 has a higher temperature than synthesis gas stream 18 due to the direct heat exchange produced by mixing the superheated steam stream 64 with synthesis gas stream 18. Additionally, the heated synthesis gas stream 80 also has an increased steam content of between about 15 percent and about 30 percent due to the addition of steam. Thus, heated synthesis gas stream 80 has more enthalpy then synthesis gas stream 18 and can therefore impart more heat to the absorption system 2 than synthesis gas stream 18 alone to increase the recovery of carbon dioxide. Moreover, such steam content is in a superheated state to allow for heated synthesis gas stream 80 to be piped over a distance without the condensation of the steam. It is to be noted, that in the prior art, two heat exchangers could be used for transferring more heat to the absorption process. However, the direct mixing of such embodiment obviates the added expense of additional heat exchangers.

Heated synthesis gas stream 80 is introduced into a heater 82 that will be discussed in detail hereinafter but is used to transfer heat from heated synthesis gas stream 80 to the regeneration zone of absorption system 2. Heated synthesis gas stream 80 is then passed into a cooler 84 (which could be air-cooled or water cooled) to condense the steam content and thereby produce a water condensate. Synthesis gas stream 84 can be then introduced into a knock-out drum 86 to separate the water condensate from heated synthesis gas stream 80 to produce a lower water content synthesis gas stream 88 and a water stream 89.

The lower water content synthesis gas stream 88 is introduced into an absorption column 90 that is designed to use an amine based solvent that is introduced as a regenerated solvent stream 92 into the top section of absorption column 90. Within column 90 are a first set of mass-transfer contact elements 94 through which solvent descends to contact ascending synthesis gas that is introduced by way of the lower water content synthesis gas stream 88 through a bottom section of absorption column 90. Such mass-transfer contact elements can be trays or packing. As the result of the contact between the synthesis gas and the solvent, a treated synthesis gas is formed as a column overhead within absorber column 90 and a rich liquid is formed as a liquid column bottoms within absorption column 90. Preferably, a wash section 96 containing trays as provided in which water is countercurrently passed to the ascending treated synthesis gas to wash out any solvent that may have vaporized within the treated synthesis gas. The water is introduced by way of a water stream 98. The treated synthesis gas stream 76 is extracted from a top section of absorption column 90 and is made up of the column overhead of absorber column 90. As the solvent descends within absorption column 90 it becomes evermore richer in carbon dioxide to form a rich liquid as a liquid column bottoms that is extracted as a rich liquid stream 100.

Preferably, the temperature of absorption column 90 is maintained at between 100° F. to about 170° F., and more preferably about 140° F. The operating pressure of the absorption column 90 is maintained at the same level as the incoming synthesis gas feed. This pressure can range anywhere from 200 to 1000 psia. A more typical range is between 300 and 400 psia. Most of the carbon dioxide contained within synthesis gas stream 18 is absorbed within the solvent.

The solvent loaded with carbon dioxide can be passed as rich liquid stream 100 to a regeneration zone to regenerate the solvent and thereby to produce the carbon dioxide that has thus been separated from the incoming synthesis gas stream 18. This is accomplished by introducing rich liquid stream 18 through a Joule-Thompson valve 102 and flashing the rich liquid into a low pressure flash column 104. The rapid lowering of pressure and resultant cooling of rich liquid stream 100 causes an initial disengagement of the carbon dioxide from the solvent. The remaining liquid loaded with solvent, an intermediate liquid, descends within mass-transfer contact elements 106 provided within low pressure flash column 104 to produce another liquid column bottoms. Heater 82 heats such liquid column bottoms without boiling the same to produce an ascending vapor that will become evermore rich in carbon dioxide as it ascends low pressure flash column 104 to produce the carbon dioxide as a column overhead. Preferably, the temperature within low pressure flash column 104 is maintained at between about 150° F. and about 210° F., preferably between about 160° F. and 190° F. A column overhead stream 108 is extracted and then cooled within a water cooler 110 to condense some of the water that is present within carbon dioxide stream 108.

Carbon dioxide stream 108 is then introduced into knockout drum 112 to separate the water which is returned as a water stream 114 to a top section of low pressure flash column 104 and into mass-transfer contact elements 116 to wash down any solvent that may be present within the carbon dioxide column overhead produced within low pressure flash column 104. The carbon dioxide stream 116 that results from the foregoing can be compressed in a compressor train 118 having stages 120 and 122, for example, with interstage cooling 123 and water removal via dryer 125. This produces a compressed carbon dioxide product stream 124 that can be used in other industrial processing as a product in and of itself or possibly for enhanced oil recovery. When used for enhanced oil recovery, the carbon dioxide product stream 124 can be compressed to a pressure of about 1200 psia to 2500 psia and then introduced, down-hole into an oil field to drive the oil into producing wells.

The regenerated solvent contained in the liquid column bottoms within low pressure flash column 104 can be extracted as regenerated solvent stream 92 which is cooled within a cooler 126 and pumped via a pump 128 back to and at the operational pressure of absorption column 90.

A carbon dioxide recovery of between about 50 and about 60 could be expected if synthesis gas stream 18 alone were introduced into absorption system 18. The use of superheated steam stream 64 at the temperature and pressure given above raises the recovery rate to between about 50 and about 90. Thus, the flow rate of superheated steam stream 64 will control the recovery rate that for economic reasons is preferably no more than about 90 percent and no less than about 50 percent by volume of the carbon dioxide in the incoming synthesis gas stream 18. The exact recovery can be controlled on an approximately linear basis by controlling the flow rate of superheated steam stream 64 to obtain the proper balance between the value of export steam stream 62 and the value of the carbon dioxide recovered.

Table 1 describes a calculated example of process conditions of syngas stream and steam supplied to the carbon dioxide recovery system and amine solution used for separation of carbon dioxide.

TABLE 1

| Synthesis gas stream 18 | |
|---|---|
| Temperature, ° F. | 275 |
| Pressure, psia | 380 |
| Compositions (mol %): | |
| $H_2$ | 64.2 |
| $CO_2$ | 14.3 |
| CO | 2.9 |
| $CH_4$ | 5.4 |
| $N_2$ | 0.2 |
| $H_2O$ | 13 |
| Flow, MMscfd | 89 |
| Superheated steam stream 64 | |
| Temperature, ° F. | 650 |
| Pressure, psia | 700 |
| Flow, lb/hr | 4,000 |
| Amine solution (% by wt.) | |
| Diethanolamine (DEA) | 25 |
| Methyldiethanolamine | 25 |

When steam pressure of superheated steam stream 64 is reduced from about 650 psia to about 380 psia, its temperature drops from between about 700° F. to 671° F. After mixing steam with synthesis gas stream 18, the temperature of the resultant heated synthesis gas stream 80 is about 285° F. and its steam content is about 15 percent on a volume basis. This heated synthesis gas stream 80 imparts energy to amine solution in heater 82. The heat supplied in heater 82 amounts to about 28 MMBtu/hr. The temperature of the heated synthesis gas stream 80 upon its discharge from the heater 82 is about 195° F. The temperature of heated synthesis gas stream 80 is further reduced to about 140° F. in cooler 84. After water separation, the resultant lower water content synthesis gas stream 88 contains about 1.3 percent moisture. In absorption column 90, the amine solution removes about 80 percent of the carbon dioxide from the incoming synthesis gas stream 18. Absorption column 90 has between about 20 and about 30 theoretical stages for purposes of the calculation. The rich liquid stream 100 from the absorption column 90 is sent to the low pressure flash column 104, which is operated at about 18 psia and contains between about 10 and about 20 theoretical stages for the calculation. The temperature at the bottom of the column is maintained at about 175° F. The carbon dioxide is recovered as carbon dioxide stream 108 and has a carbon dioxide content of about 70 percent by volume, remainder substantially water with small amounts of hydrogen carbon monoxide and methane. The carbon dioxide stream 116 contains about 92 percent carbon dioxide.

Figure 3:
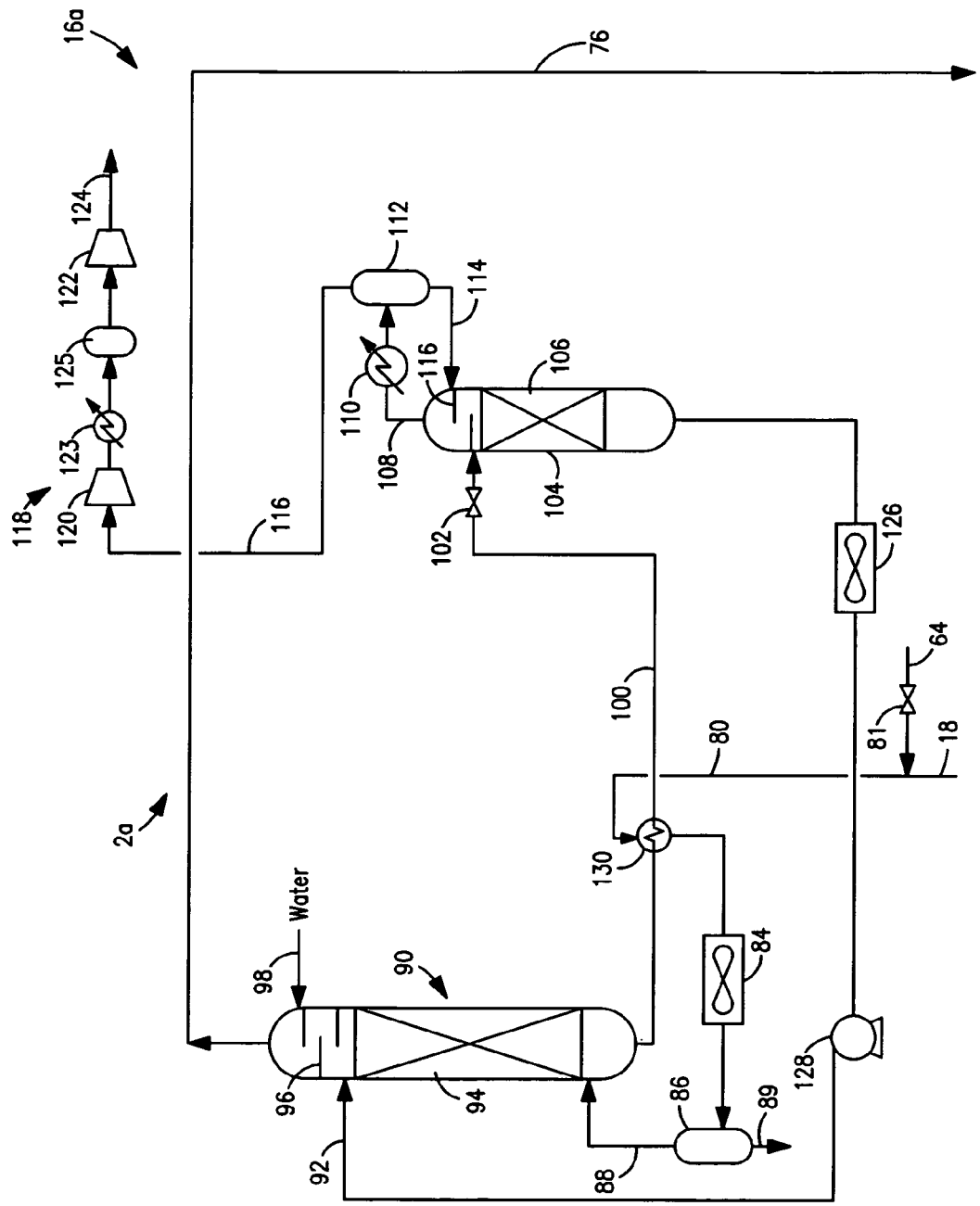
FIG. 3 is an alternative embodiment of FIG. 2.

With reference to FIG. 3, a carbon dioxide separation system 16a is disclosed that could be used in place of carbon dioxide separation system 16. Carbon dioxide separation system 16a utilizes an absorption system 2a in which heat is added to the regeneration zone by indirectly exchanging heat with heated synthesis gas stream 80 in a heat exchanger 130. To achieve the same carbon dioxide recovery using absorption system 2a as that of absorption system 2, the overall heat supplied in heater 130 will be between about 7 percent and about 9 percent higher than that supplied in heater 82 of FIG. 2. Although the separation system of FIG. 3 is less efficient than that shown in FIG. 2, it offers following operational benefits. In the separation system of FIG. 2, since the solvent in heater 82 is at temperature much below the boiling point of the solvent, the thermosiphon effect for circulating solvent through heater 82 is not available. As a result, if that heater is located outside the flash column 104, then an external pump with high circulation capacity must be installed to circulate the solvent through the heater and then back into the column. This requires additional capital expense and maintenance of rotating machine. Alternatively, heater 82 can be placed within the sump of the flash column 104. This option makes maintenance of heat exchanger tubes more difficult. It also requires increase in solvent inventory in the column sump and increased column size to accommodate heater 82. The absorption system of FIG. 3 eliminates all these issues as there is no need for extra solvent circulation pumps or extra column sump volume. In a separation system of FIG. 3, it is also possible to simply utilize a low pressure flash tank in place of low pressure flash column 106.

Figure 4:
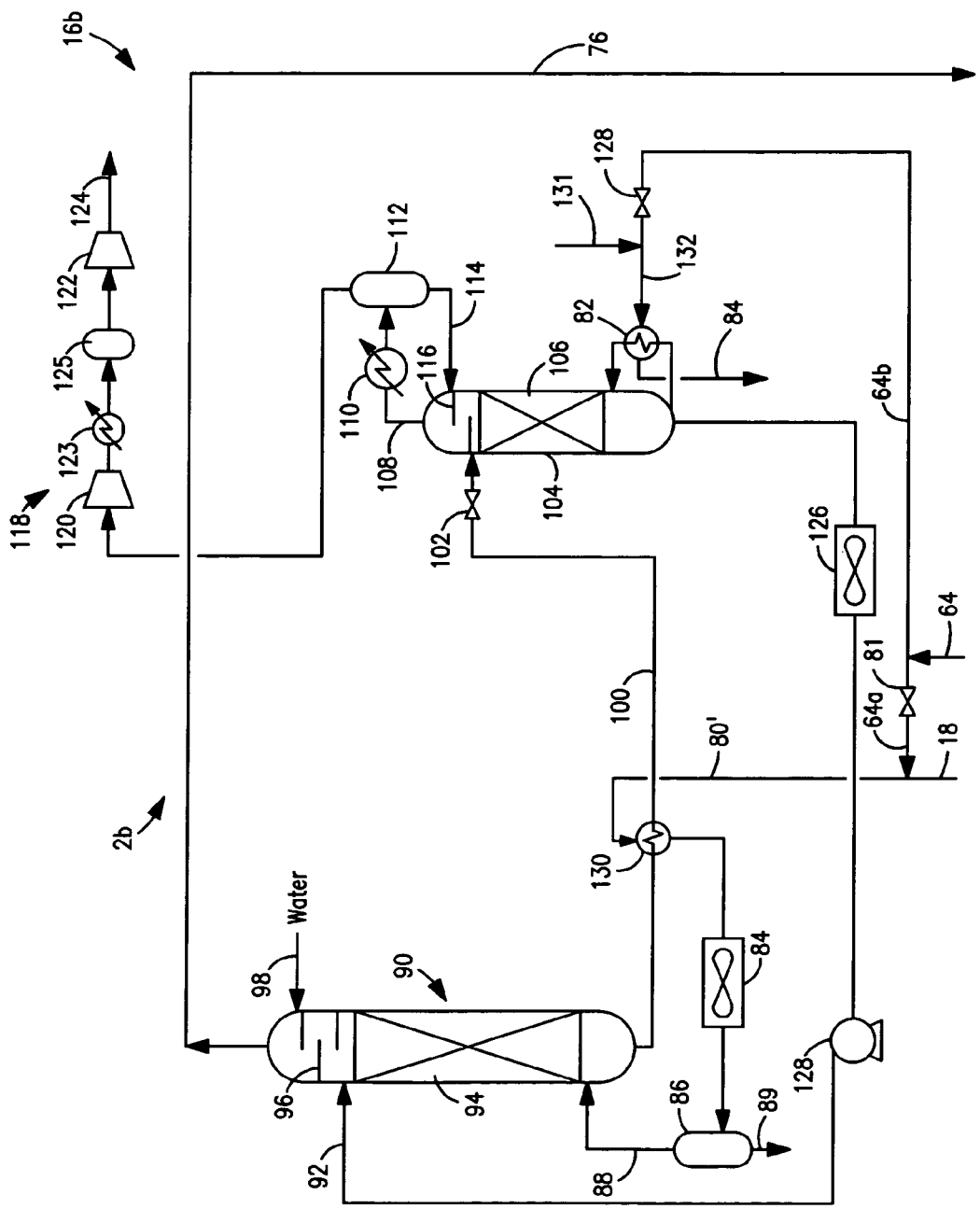
FIG. 4 is an alternative embodiment of FIG. 3.

With reference to FIG. 4, a carbon dioxide separation system 16b is illustrated that has an absorption system 2b that can be used in place of carbon dioxide separation system 16. In carbon dioxide separation system 16b, superheated steam stream 64 is dividing into first and second subsidiary streams 64a and 64b, respectively. Subsidiary stream 64a is combined with synthesis gas stream 18 to produce a heated synthesis gas stream 80' having a higher steam content and temperature than synthesis gas stream 18. Heated synthesis gas stream 80' indirectly exchanges heat with rich liquid stream 100 in heat exchanger 130. The pressure of second subsidiary stream 64b is reduced by a valve 131 and its temperature is preferably further reduced by addition of a water stream 131. The resultant combined stream 132 is introduced into heat exchanger 82 and then discharged as a stream 84.

As is evident in this embodiment of the present invention, some of the heat being transferred to promote disengagement of the carbon dioxide from the solvent in rich liquid stream 100 which will be flashed into low pressure flash column 104 while the remainder of the steam will be used in heating the liquid column bottoms within low pressure flash column 104 without boiling the liquid column bottoms, but yet initiating the creation of an ascending vapor phase. In an alternative embodiment, second subsidiary stream 64b can be introduced directly into the flash column 104 and eliminate some of the operational and maintenance issues mentioned earlier. In this alternative, to maintain the water balance, a portion of condensed water stream 114 can be purged.

Figure 5:
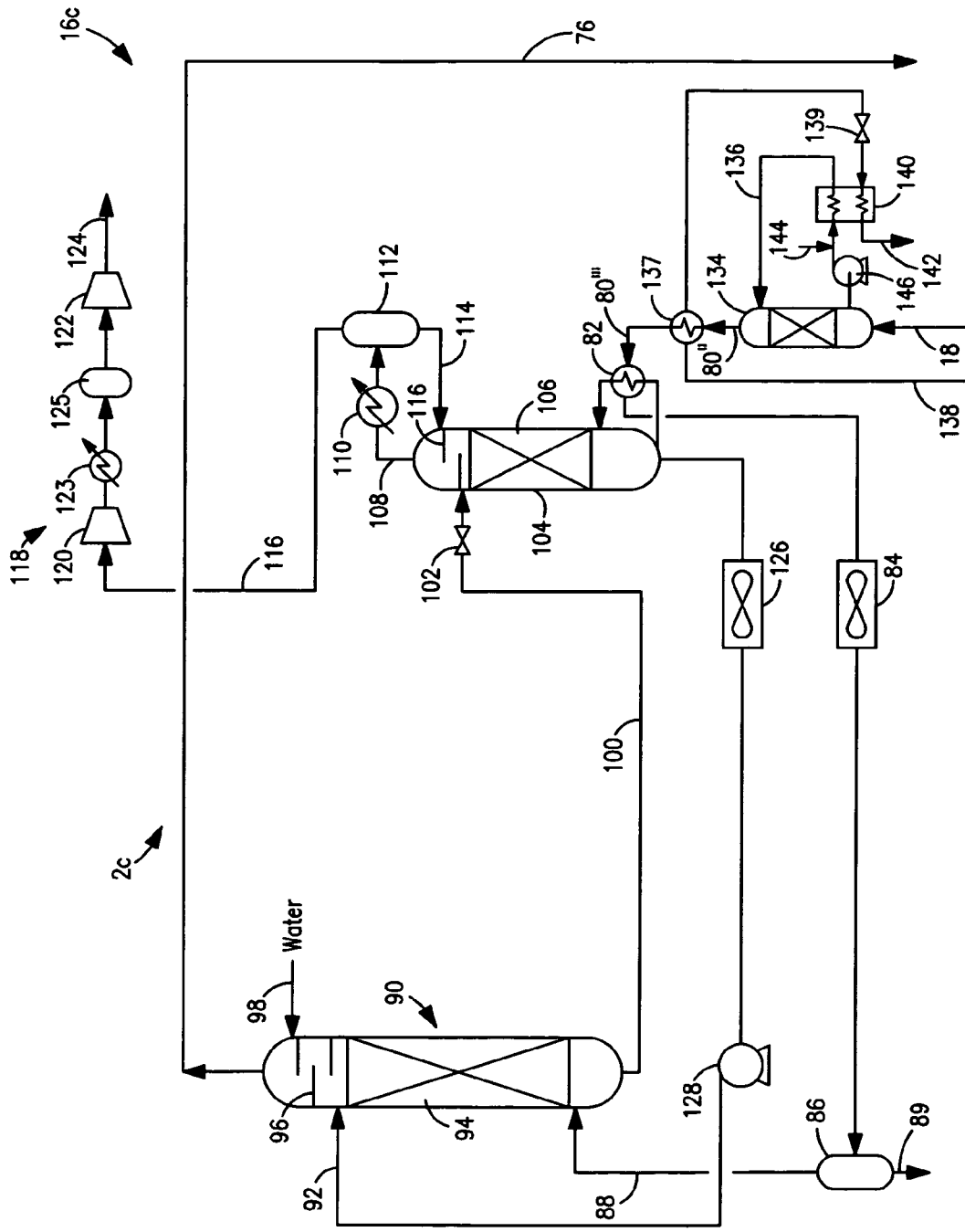
FIG. 5 is an alternative embodiment of an absorption system for carrying out a method in accordance with the present invention.

FIG. 5 shows an alternative embodiment in which the enthalpy of the incoming synthesis gas stream 18 is increased with steam. However, low pressure steam is economically utilized in this embodiment, illustrated as carbon dioxide separation system 16c and utilizing a carbon dioxide absorption system 2c. Carbon dioxide absorption system 2c has a saturator column 134 into which synthesis gas stream 18 is introduced. Synthesis gas stream 18 through direct heat transfer with a heated water stream 136 within saturator column 134 gains steam at a higher temperature to produce a partly heated synthesis gas stream 80'' that is in turn heated in a superheater 137 to produce heated synthesis gas stream 80'''. Heated synthesis gas stream 80''' is introduced into heat exchanger 82 to transfer heat to the column bottoms within the low pressure flash column 104 and thereby transfer heat to the regeneration zone. A low pressure steam stream 138 is introduced into superheater 137 to indirectly transfer additional heat to the partly heated synthesis gas stream 80'' and thereby superheat the steam content thereof and produce the heated synthesis gas stream 80'''. The pressure of low pressure steam stream 138 is then reduced by provision of a Joule-Thompson valve 139 and then introduced into heat exchanger 140 to indirectly heat water stream 136. A make-up water stream 144 is added to the flow circuit and is circulated by a circulation pump 146. Carbon dioxide separation system otherwise operates in a similar manner to carbon dioxide separation system 16.

To achieve same level of performance as that of example described for FIG. 2, low pressure steam stream 138 at 150 psia and 400° F. with a flow of about 5,000 lb/hr will be needed. The make-up water stream 144 flow will be set at about 4,000 lb/hr. The temperature of water stream 136 will be controlled at 295° F. before it is fed to the saturator column 134. A portion of condensed low pressure steam 142 can be pumped to high pressure and used as make-up water for make-up water stream 144.

As can be appreciated this concept of the use of low pressure steam and the saturator could be used in any of the foregoing embodiments. For example, heated synthesis gas stream 80 could be directly replaced by heated synthesis gas stream 80''' formed in the manner outlined above with respect to FIG. 5. As to the carbon dioxide separation system of 16b, only part of the low pressure steam 138 would be as a subsidiary stream in a saturator to create heated synthesis gas stream 80''' to replace heated synthesis gas stream 80' used with such embodiment. The other portion of the low pressure steam could be used in heat exchanger 82 associated with low pressure flash column 104.

While the present invention has been described with respect to a preferred embodiment as will occur to those skilled in the art numerous changes, additions and omissions can be made without departing from the spirit and the scope of the present invention.

We claim:

1. A method of recovering carbon dioxide from synthesis gas stream generated within a facility having a synthesis gas reactor, a water-gas shift reactor and a steam generation system for generating steam for the synthesis gas reactor and for export, said method comprising:

extracting a synthesis gas stream from the facility after the synthesis gas stream has passed through at least one process heat exchanger of the steam generation system wherein at least one process heat exchanger being located downstream of the water-gas shift reactor and the synthesis gas stream upon extraction from the facility having an initial steam content that is at or near dew point;

exchanging heat from at least part of a steam stream to the synthesis gas stream, after extraction from the facility, to increase temperature of the synthesis gas stream while simultaneously adding steam to the synthesis gas stream such that a heated synthesis gas stream is produced that has a final steam content that is in a superheated state;

introducing the heated synthesis gas stream to an absorption system having an absorption zone utilizing a solvent for absorbing the carbon dioxide contained within the heated synthesis gas stream, thereby to produce a rich liquid containing the carbon dioxide and a treated synthesis gas stream having a lower content of the carbon dioxide than said synthesis gas stream and a regeneration zone operatively associated with the absorption zone for receiving solvent after having absorbed carbon dioxide and disengaging the carbon dioxide from the solvent, thereby to regenerate the solvent and for returning the solvent after having been regenerated to the absorption zone;

transferring heat from the heated synthesis gas stream to the regeneration zone for promoting the disengagement of the carbon dioxide from the rich liquid;

recovering a carbon dioxide stream composed of the carbon dioxide separated from the rich liquid; and the flow rate of the steam stream being controlled so that between about 40 percent and about 90 percent of the carbon dioxide contained in the synthesis gas stream is recovered in the carbon dioxide stream.

2. The method of claim 1, wherein the steam stream is superheated stream and the heat is transferred to the synthesis gas stream and steam is added thereto by extracting superheated steam from the steam generation system, forming the steam stream from the superheated steam and combining at least part of the steam stream with the synthesis gas stream.

3. The method of claim 1, wherein the steam stream is low pressure steam and the heat is transferred to the synthesis gas stream and steam is added thereto by introducing the synthesis gas stream into a saturator and indirectly transferring heat from the steam stream to a water stream from the saturator and thereafter re-introducing the water stream into the saturator so that the synthesis gas stream and the water stream are counter-currently passed through the saturator and transferring heat to the synthesis gas stream from the steam stream after the addition of the steam thereto through indirect heat exchange with the steam stream.

4. The method of claim 2 or claim 3, wherein:

the heated synthesis gas stream is cooled to condense water contained therein, thereby to produce a condensate and the condensate is separated from the heated synthesis gas stream after cooling to produce a lower water content synthesis gas stream;

the absorption zone is formed by an absorption column and the lower water content synthesis gas stream and the solvent are counter-currently passed within a first set of mass-transfer contact elements located within the absorption column to absorb the carbon dioxide in the solvent as the solvent descends in the absorption column, thereby to produce the rich liquid as a first liquid column bottoms and the treated synthesis gas as a first tower overhead;

the regeneration zone includes a low pressure flash column and the solvent containing the absorbed carbon dioxide is expanded into a low pressure flash column to produce the initial disengagement of a portion of the carbon dioxide from the rich liquid and an intermediate liquid containing the solvent and a further portion of the carbon dioxide, the low pressure flash column including a second set of mass-transfer contact elements to contact the intermediate liquid as it descends through the second set of mass-transfer contact elements with an ascending vapor phase to effect an additional disengagement of the further portion of the carbon dioxide from the intermediate liquid and a liquid column bottoms, thereby to produce a second tower overhead composed of the carbon dioxide and a second liquid column bottoms composed of regenerated solvent;

a regenerated solvent stream, made up of the second liquid column bottoms, is extracted from the low pressure flash column, cooled and then pumped back into the absorption column to introduce the solvent into the absorption column to absorb the carbon dioxide; and the carbon dioxide stream is made up of the second tower overhead and is extracted from the low pressure flash column.

5. The method of claim 4, wherein:

the solvent functions as both a physical absorbent and a chemisorbent;

a water stream is added to the absorption column and washes down any solvent contained in treated synthesis gas used in forming the treated synthesis gas stream;

the condensate derived from the heated synthesis gas stream is a first condensate and the water content separated therefrom is a first water content;

the carbon dioxide stream is cooled to condense out a second water content of the carbon dioxide stream and thereby to produce a second condensate; and a second condensate stream composed of the second condensate is introduced into the low pressure flash column and washes down any solvent contained in the carbon dioxide produced as the second tower overhead.

6. The method of claim 5, wherein the carbon dioxide stream is compressed in stages with interstage cooling and water removal to form a compressed carbon dioxide stream.

7. The method of claim 5, wherein the heat is transferred to the regeneration zone by indirectly exchanging heat from the heated synthesis gas stream to the second liquid column bottoms so that the ascending vapor phase is formed without boiling the second liquid column bottoms.

8. The method of claim 5, wherein the heat is indirectly transferred from the heated synthesis gas stream to the rich liquid stream prior to being expanded into the low pressure flash column.

9. The method of claim 5, wherein:

the steam stream is divided into first and second subsidiary streams;

part of the heat is transferred from the first subsidiary stream to the synthesis gas stream while adding steam thereto, thereby to form the heated synthesis gas stream;

a remaining part of the heat is transferred from the second subsidiary stream to the second liquid column bottoms so that the ascending vapor phase is formed without boiling the second liquid column bottoms; and heat is indirectly transferred from the heated synthesis gas stream to a rich liquid stream composed of the rich liquid; and the rich liquid stream is expanded into the low pressure flash column.

10. The method of claim 7, wherein the carbon dioxide stream is compressed in stages with interstage cooling and water removal to form a compressed carbon dioxide stream.

11. The method of claim 8, wherein the carbon dioxide stream is compressed in stages with interstage cooling and water removal to form a compressed carbon dioxide stream.

12. The method of claim 9, wherein the carbon dioxide stream is compressed in stages with interstage cooling and water removal to form a compressed carbon dioxide stream.

* * * * *